United States Patent
Park et al.

(10) Patent No.: US 10,606,123 B2
(45) Date of Patent: Mar. 31, 2020

(54) DISPLAY DEVICE HAVING A LIGHT CONVERSION MEMBER AND METHOD FOR FABRICATING THE SAME

(71) Applicant: SAMSUNG DISPLAY CO., LTD., Yongin-si, Gyeonggi-Do (KR)

(72) Inventors: Jinho Park, Suwon-si (KR); Sang-gil Lee, Seoul (KR); Taegil Kang, Hwaseong-si (KR); Namheon Kim, Seongnam-si (KR); Hyuk-hwan Kim, Hwaseong-si (KR); Haeil Park, Seoul (KR); Baekhee Lee, Seoul (KR); Eunguk Lee, Seoul (KR); Jaejin Choi, Seongnam-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 47 days.

(21) Appl. No.: 15/942,927

(22) Filed: Apr. 2, 2018

(65) Prior Publication Data

US 2019/0064589 A1    Feb. 28, 2019

(30) Foreign Application Priority Data

Aug. 29, 2017 (KR) .................. 10-2017-0109653

(51) Int. Cl.
| | |
|---|---|
| *G02F 1/1335* | (2006.01) |
| *F21V 8/00* | (2006.01) |
| *G02F 1/1339* | (2006.01) |
| *G02F 1/1343* | (2006.01) |
| *G02F 1/1333* | (2006.01) |

(52) U.S. Cl.
CPC ....... *G02F 1/133602* (2013.01); *G02B 6/005* (2013.01); *G02B 6/0025* (2013.01); *G02F 1/1339* (2013.01); *G02F 1/1343* (2013.01); *G02F 1/13394* (2013.01); *G02F 1/133608* (2013.01); *G02B 6/0086* (2013.01); *G02F 2001/133311* (2013.01);
(Continued)

(58) Field of Classification Search
CPC . G02F 2202/022; G02B 6/005; G02B 6/0088; G02B 6/0055; G02B 6/0053
See application file for complete search history.

(56) References Cited

U.S. PATENT DOCUMENTS

| | | |
|---|---|---|
| 9,184,403 B2 | 11/2015 | Cho et al. |
| 9,637,683 B2 | 5/2017 | Lee et al. |

(Continued)

FOREIGN PATENT DOCUMENTS

| | | |
|---|---|---|
| JP | 2017068248 | 4/2017 |
| KR | 1020150040608 | 4/2015 |

(Continued)

*Primary Examiner* — Gerald Johnson
(74) *Attorney, Agent, or Firm* — F. Chau & Associates, LLCC

(57) ABSTRACT

A display device includes a backlight unit. A display module configured to display an image is disposed on the backlight unit. A light conversion member is disposed between the display module and the backlight unit. The backlight unit includes a light source unit configured to generate light and a light guide plate configured to guide the light generated by the light source unit. The light conversion member includes a transfer layer disposed on the backlight unit and a light conversion layer disposed on the transfer layer.

21 Claims, 12 Drawing Sheets

(52) U.S. Cl.
 CPC ............ *G02F 2001/133614* (2013.01); *G02F 2201/50* (2013.01); *G02F 2202/36* (2013.01)

(56) References Cited

U.S. PATENT DOCUMENTS

| | | | | |
|---|---|---|---|---|
| 2012/0257414 | A1* | 10/2012 | Park | G02B 6/0068 |
| | | | | 362/611 |
| 2014/0147577 | A1* | 5/2014 | Lee | H01L 51/56 |
| | | | | 427/8 |
| 2015/0255694 | A1* | 9/2015 | Lee | H01L 33/58 |
| | | | | 257/88 |
| 2016/0062178 | A1 | 3/2016 | Kim et al. | |
| 2016/0195773 | A1 | 7/2016 | Lee et al. | |
| 2016/0217723 | A1 | 7/2016 | Kim et al. | |
| 2016/0217732 | A1 | 7/2016 | Kim et al. | |
| 2016/0223732 | A1 | 8/2016 | Jeon et al. | |
| 2017/0222182 | A1* | 8/2017 | Mo | H01L 51/524 |
| 2017/0299785 | A1* | 10/2017 | Saitoh | B32B 7/02 |
| 2017/0299792 | A1 | 10/2017 | Oh et al. | |
| 2018/0105658 | A1* | 4/2018 | Cho | C08J 5/18 |
| 2019/0006620 | A1* | 1/2019 | Kim | H01L 51/5253 |

FOREIGN PATENT DOCUMENTS

| | | |
|---|---|---|
| KR | 1020150047401 | 5/2015 |
| KR | 1020160028580 | 3/2016 |
| KR | 1020160038325 | 4/2016 |
| KR | 1020160084557 | 7/2016 |
| KR | 1020160091523 | 8/2016 |
| KR | 1020160092129 | 8/2016 |
| KR | 1020160092131 | 8/2016 |
| KR | 10-1660163 | 9/2016 |

\* cited by examiner

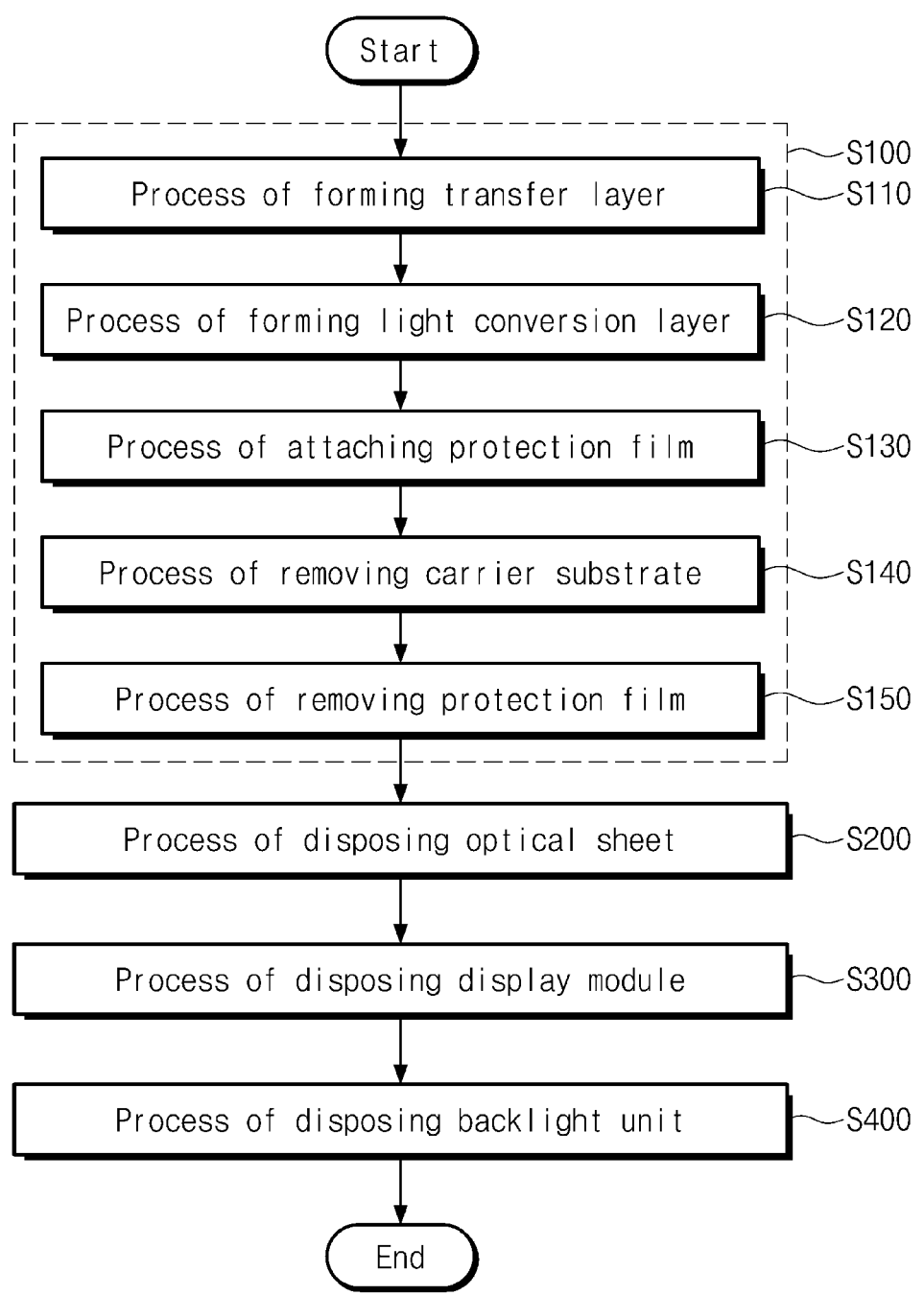

DISPLAY DEVICE HAVING A LIGHT CONVERSION MEMBER AND METHOD FOR FABRICATING THE SAME

CROSS-REFERENCE TO RELATED APPLICATIONS

This U.S. non-provisional patent application claims priority under 35 U.S.C. § 119 to Korean Patent Application No. 10-2017-0109653, filed on Aug. 29, 2017, the entire contents of which are hereby incorporated by reference.

TECHNICAL FIELD

The present disclosure relates to a display device, and more particularly, to a display device including a light conversion member and a method for fabricating the same.

DISCUSSION OF THE RELATED ART

Examples of commonly used display devices include liquid crystal display devices, electrowetting display devices, and eletrophoretic display devices. Such display devices may be characterized as either a non-emissive type display panel, which utilizes a separate backlight unit for providing light to the display panel, or as an emissive type display panel, which does not require the use of a backlight unit. For non-emissive type display panels, the backlight unit may be used to supply light to the display panel. The light provided from the backlight unit may be converted into light having desired color(s) and thus, the display device may be seen by viewers.

In some display devices, a wavelength conversion member including light conversion particles such as phosphors or quantum dots, are used. These light conversion particles may be capable of converting the wavelength of light generated in the backlight unit into light of desired wavelengths.

SUMMARY

A display device includes a backlight unit. A display module configured to display an image is disposed on the backlight unit. A light conversion member is disposed between the display module and the backlight unit. The backlight unit includes a light source unit configured to generate light and a light guide plate configured to guide the light generated by the light source unit. The light conversion member includes a transfer layer disposed on the backlight unit and a light conversion layer disposed on the transfer layer.

A method for fabricating a display device includes disposing a light conversion layer on a transfer layer to form a light conversion member. An optical sheet is disposed on the light conversion member. A display module is disposed on the optical sheet. A backlight unit is disposed under the light conversion member. Forming the light conversion member further includes applying a monomer to a carrier substrate to form the transfer layer, forming a resin layer and the light conversion layer including light conversion particles on the transfer layer, attaching a protection film on the light conversion layer, removing the carrier substrate, and removing the protection film. The protection film has an adhesion force greater than that of the transfer layer.

BRIEF DESCRIPTION OF THE FIGURES

A more complete appreciation of the present disclosure and many of the attendant aspects thereof will be readily obtained as the same becomes better understood by reference to the following detailed description when considered in connection with the accompanying drawings, wherein:

FIG. 8 is a flowchart illustrating a method for fabricating a display device according to an exemplary embodiment of the present inventive concept;

DETAILED DESCRIPTION

Figure 1:
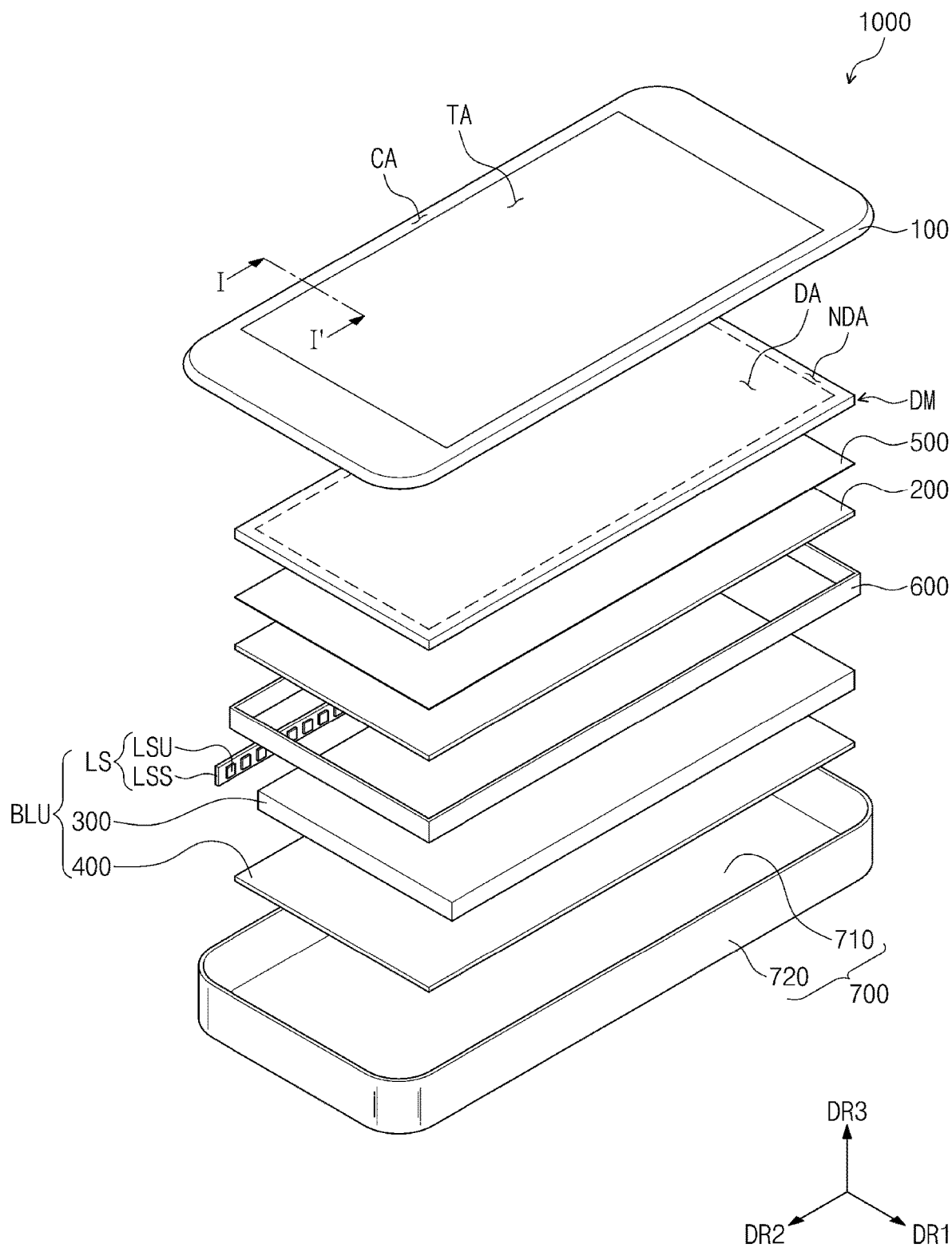
FIG. 1 is a perspective view illustrating a display device according to an exemplary embodiment of the present inventive concept.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner, It will be understood that when one component (or region, layer, portion) is referred to as being 'on', 'connected to', or 'coupled to' another component, it can be directly connected/coupled on/to the one component, or an intervening third component may also be present.

Like reference numerals may refer to like elements throughout the specification and the figures. In the figures, the thickness, ratio, and dimensions of various components may be exaggerated for clarity of illustration, It will be understood that although the terms such as 'first' and 'second' are used herein to describe various elements, these elements should not be limited by these terms. The terms are only used to distinguish one component from other components. For example, a first element referred to as a first element in one embodiment can be referred to as a second element in another embodiment without departing from the scope of the present disclosure. The terms of a singular form may include plural forms unless referred to the contrary.

Also, ""under", "below", "above", "upper", and the like are used for explaining relation association of components illustrated in the drawings. The terms may be a relative concept and described based on directions expressed in the drawings.

The meaning of 'include' or 'comprise' specifies a property, a fixed number, a step, an operation, an element, a component or a combination thereof, but does not exclude other properties, fixed numbers, steps, operations, elements, components or combinations thereof.

Hereinafter, a display device according to an exemplary embodiment of the present inventive concept will be described in detail.

Figure 2:
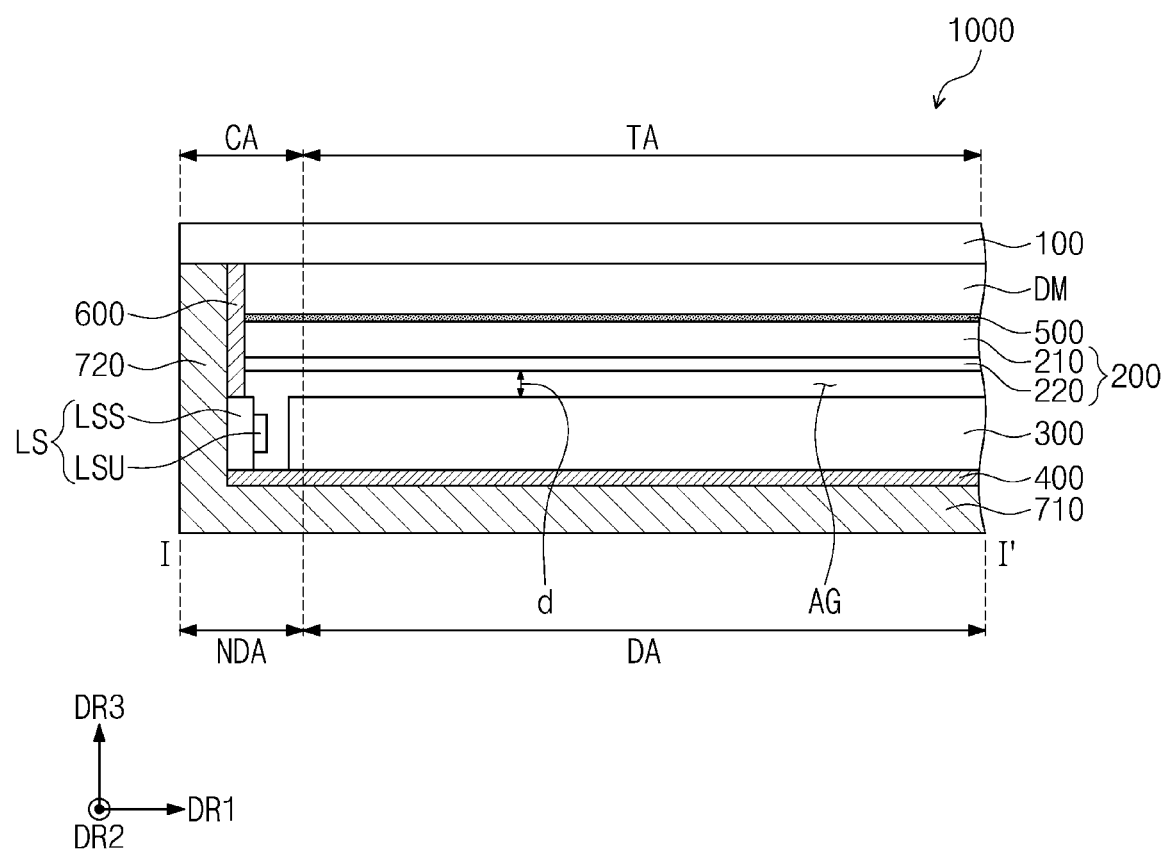
FIG. 2 is a cross-sectional view illustrating the display device according to an exemplary embodiment of the present inventive concept.

FIG. 1 is a perspective view illustrating a display device according to an exemplary embodiment of the present inventive concept. FIG. 2 is a cross-sectional view illustrating a display device according to an exemplary embodiment of the present inventive concept. FIG. 2 is a cross-sectional view taken along line I-I' of FIG. 1. Hereinafter, a display device according to an exemplary embodiment of the present inventive concept will be described with reference to FIGS. 1 and 2.

Referring to FIGS. 1 and 2, a display device 1000 according to an exemplary embodiment of the present inventive concept includes a window member 100, a display module DM, a light conversion member 200, and a backlight unit BLU. The display device 1000 may further include an optical sheet 500, a sealing member 600, and an accommodation member 700, which may be an outer casing or another supportive encasing structure.

For convenience of description, a direction in which an image is provided from the display device 1000 may be defined as an upward direction, and a direction opposite to the upward direction may be defined as a downward direction. Here, upward and downward directions are expressed in terms of a "third direction" DR3 that is defined in a normal direction of a plane defined by first and second directions DR1 and DR2. The third direction DR3 may be a reference direction for dividing front and rear surfaces of components that will be described below. However, the upward direction and the downward direction may be a relative concept, and thus may be interchanged.

The window member 100 may include a light transmitting part TA, that transmits an image provided from the display module DM, and a light blocking part CA, through which the image is not transmitted. The light transmitting part TA is disposed on a central portion of the display device 1000 on a plane defined in the first and second directions DR1 and DR2. The light blocking part CA is disposed around the light transmitting part TA and the light blocking part CA has a frame shape surrounding the light transmitting part TA.

According to an exemplary embodiment of the present inventive concept, the window member 100 of the display device 1000 may include only the light transmitting part TA. For example, the light blocking part CA may be omitted. In this case, an image may be transmitted through an entire top surface of the window member 100.

The window member 100 may include a transparent material such as glass, sapphire, or plastic.

The display module DM is disposed under the window member 100. The display module DM displays an image by passing light generated in the backlight unit BLU through the light conversion member 200.

A display area DA on which an image is displayed on the display module DM and a non-display area NDA on which the image is not displayed share a plane. The display area DA may be defined at a center of the display module DM to overlap the light transmitting part TA of the window member 100. Hereinafter, the display module DM will be described in more detail with reference to FIG. 5.

The backlight unit BLU may be disposed under the display module DM to provide light the display module DM. Here, the backlight unit BLU may be an edge-type backlight unit. For example, in the backlight unit BLU, a light source unit LS provides light to a side surface of a light guide plate 300 to emit the light from a top surface of the light guide plate 300.

The backlight unit BLU may include the light source LS, the light guide plate 300, and a reflection sheet 400.

The light source LS is disposed at one side of the light guide plate 300 in the first direction DR1. However, the present disclosure is not limited to the position of the light source LS. For example, the light source LS may be disposed adjacent to at least one side surface of side surfaces of the light guide plate 300.

The light source LS includes a plurality of light source units LSU and a single light source substrate LSS. The light source units LSU generates light to be provided to the display module DM to provide the generated light to the light guide plate 300.

Here, the light source units LSU may generate a first light. For example, the first light may have a wavelength hand of about 400 nm to about 500 nm. For example, the light source units LSU may generate a blue or near-blue light.

Here, each of the light source units LSU may have a shape in which a light emitting diode (LED) is used as a point light source. However, the present disclosure is not limited to using this kind of light source units LSU.

Also, the present disclosure is not limited in the number of light source units LSU that may be used. According to an exemplary embodiment of the present inventive concept, only a single light source unit LSU may be provided, for example, as one point light source using LED device. Alternatively, the light source units LSU may be provided with a plurality of LED groups. Also, according to an exemplary embodiment of the present inventive concept, the light source units LSU may be a line light source.

The light source units LSU may be mounted on a light source substrate LSS. The light source substrate LSS may be disposed to face one side of the light guide plate 300 in the first direction DR1 and may extend in the second direction DR2. The light source substrate LSS may include a light source control unit connected to the light source units LSU. The light source control unit may analyze an image displayed on the display panel DP to output a local dimming signal and control luminance of light generated by the light source LS in response to the local dimming signal. According to an exemplary embodiment of the present inventive concept, the light source control unit may be mounted on a separate circuit board. However, the light source control unit may be mounted in any desired manner.

The light guide plate 300 is disposed under the display module DM. The light guide plate 300 may have a substantially planar shape. The light guide plate 300 may change a traveling direction of the light provided from the light source LS so that the light travels in the upward direction in which the display panel 110 is disposed. The light guide plate 300 may include an emission pattern disposed under the light guide plate 300 so that the light transmitted therethrough may be evenly provided in the upward direction.

The light guide plate 300 may include a material having high light transmittance in a visible light region. The light guide plate 300 may include a material having a refractive index of about 1.4 to about 1.8. In the display device, according to an exemplary embodiment of the present inventive concept, the light guide plate 300 may include a glass material and may have a refractive index of about 1.6. However, the present inventive concept is not limited thereto. For example, the light guide plate 300 may include a transparent polymer resin such as polycarbonate or polymethyl methacrylate (PMMA).

A reflection sheet 400 may be disposed under the light guide plate 300. The reflection sheet 400 reflects light emitted downwardly from the light guide plate so that the light is emitted upward. The reflection sheet 400 may reflect light that leaks and would otherwise not travel toward the display module DM to change a path of the light so that the reflected light travels toward the display module DM. Thus, the reflection sheet 400 increases an amount of light provided to the display module DM. The reflection sheet 400 includes a light reflecting material. For example, the reflection sheet 400 may include aluminum and/or silver.

The display device 1000, according to an exemplary embodiment of the present inventive concept, includes a light conversion member 200 disposed between the display module DM and the backlight unit BLU. The light conversion member 200 may convert the light generated in the backlight unit BLU and thereby may provide the converted light to the display module DM. The light conversion member 200 includes a light conversion layer 210 and a transfer layer 220. Hereinafter, the light conversion member 200 will be described in more detail with reference to FIGS. 6A and 6B.

The optical sheet 500 may be disposed between the light guide plate 300 and the display module DM. The optical sheet 500 may be disposed between the light conversion member 200 and the display module DM. Light generated in the light source LS and guided by the light guide plate 300 may be provided to the optical sheet 500 via the light conversion member 200 and may then be diffused and collected by the optical sheet 500 and thereby provided to the display module DM.

The optical sheet 500, according to an exemplary embodiment of the present inventive concept, may include a plurality of sheets. For example, the optical sheet 500 may include a diffusion sheet, a prism sheet, and a protection sheet. The optical sheet 500 may include a dual brightness enhancement film (DBEF). The diffusion sheet may diffuse the light provided from the light guide plate 300. The prism sheet may be disposed above the diffusion sheet to collect the light diffused by the diffusion sheet and guide this light in an upward direction that is perpendicular to the plane. The protection sheet may protect prisms of the prism sheet against external impact. The DBEF may selectively transmit light according to a wavelength of the light and allow light of other wavelengths to return in a downward direction. In the display device 1000, according to an exemplary embodiment of the present inventive concept, the optical sheet 500 may include any number and kind of sheets. For example, various kinds and numbers of sheets may be provided.

An adhesion layer may be disposed on top and bottom surfaces of the optical sheet 500, according to an exemplary embodiment of the present inventive concept. The adhesion layer may be an optical clear adhesive (OCA), a pressure sensitive adhesive (PSA), and/or an optical clear resin (OCR). The optical sheet 500 and the light conversion member 200 may be attached to each other through the adhesion layer. The optical sheet 500 and the display module DM may be attached to each other through the adhesion layer.

The sealing member 600 may be disposed on side surfaces of the display module DM, the optical sheet 500, and the light conversion member 200. The sealing member 600 may cover the side surfaces of the display module DM, the optical sheet 500, and the light conversion member 200. The sealing member 600 may have a shape that surrounds edges of the side surfaces of the display module DM, the optical sheet 500, and the light conversion member 200. The sealing member 600 may cover the edges of the side surfaces of the display module DM, the optical sheet 500, and the light conversion member 200 to prevent foreign substances such as moisture and oxygen from being introduced into the display module DM, the optical sheet 500, and the light conversion member 200. Also, the sealing member 600 may fix the display module DM, the optical sheet 500, and the light conversion member 200. The sealing member 600 may extend downward to further cover a side surface of the side surfaces of the light guide plate 300, on which the light source LS is not disposed. In this case, the sealing member 600 may fix the display module DM, the optical sheet 500, the light conversion member 200, and the light guide plate 300.

The accommodation member 700 may be disposed on the lowermost end of the display device 1000 to accommodate the backlight unit BLU. The accommodation member 700 includes a bottom part 710 and a plurality of sidewalls 720 connected to the bottom part 710. According to an exemplary embodiment of the present inventive concept, the light source LS may be disposed on one inner surface of the plurality of sidewalls 720 of the accommodation member 700. The accommodation member 700 may include a rigid metal.

In the display device 1000, according to an exemplary embodiment of the present inventive concept, the backlight unit BLU and the light conversion member 200 may be spaced by a predetermined distance "d" from each other. For example, a top surface of the light guide plate 300 provided in the backlight unit BLU and a bottom surface of the transfer layer 220 provided in the light conversion member 200 are spaced apart from each other by a predetermined distance "d".

Since the light guide plate 300 and the transfer layer 220 are spaced apart from each other by the predetermined distance d, an air-gap AG may be defined between the light guide plate 300 and the transfer layer 220 as illustrated in FIG. 2. For example, an air layer may be provided between the light guide plate 300 and the transfer layer 220, which are spaced apart from each other by the predetermined distance d.

Since the air-gap AG is defined above the light guide plate 300, the light guide efficiency of the light guide plate 300 may be increased. Since the air-gap AG defined above the light guide plate 300 corresponds to the air layer, the air-gap AG may have a refractive index less than that of the light guide plate 300. For example, the light guide plate 300 may have a refractive index of about 1.6, and the air-gap AG may have a refractive index of about 1.0. Since the air-gap AG having the relatively low refractive index is provided above the light guide plate 300, light incident in a direction of the air-gap AG at a large incident angle within the light guide plate 300 may be totally reflected. Thus, in the edge-type backlight unit according to an exemplary embodiment of the present inventive concept, the light guide efficiency due to the light guide plate 300 may be increased.

Figure 3:
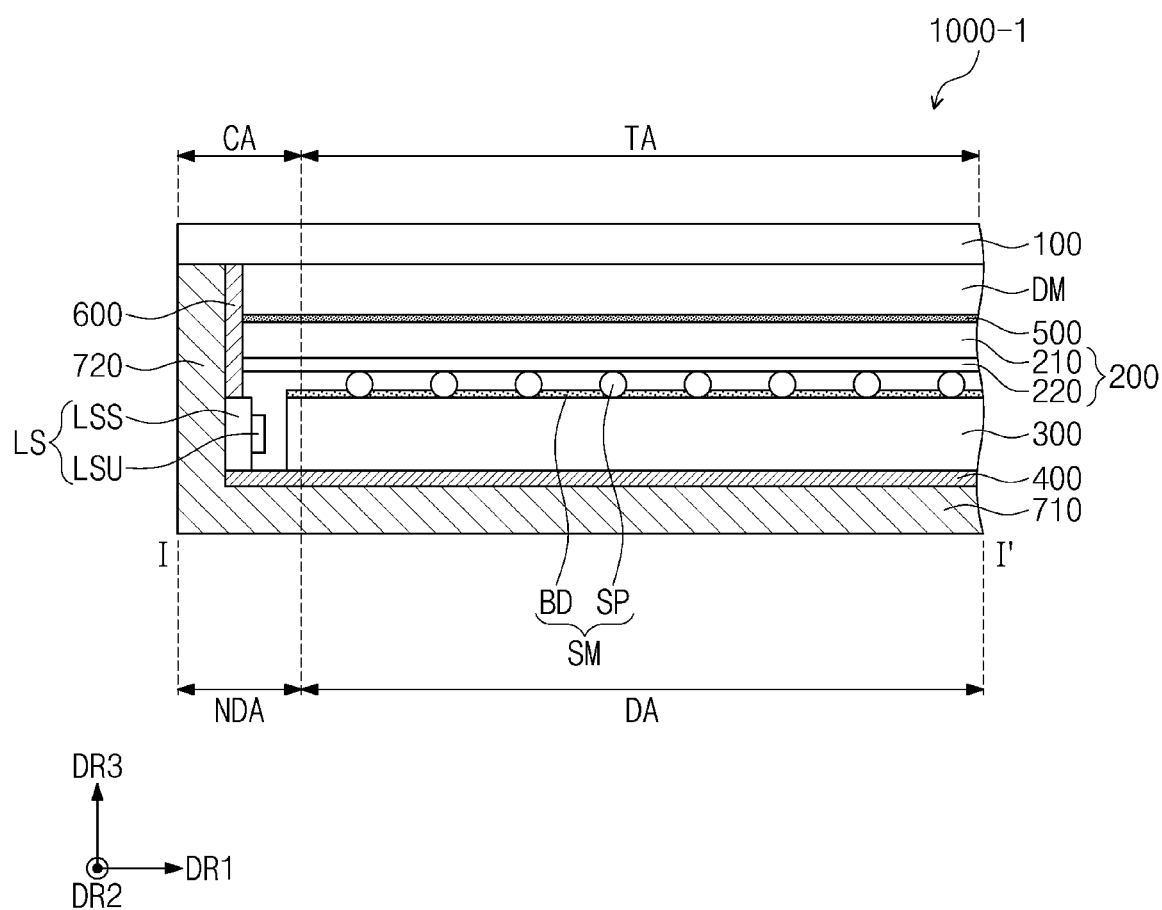
FIG. 3 is a cross-sectional view illustrating a display device according to an exemplary embodiment of the present inventive concept.
Figure 4:
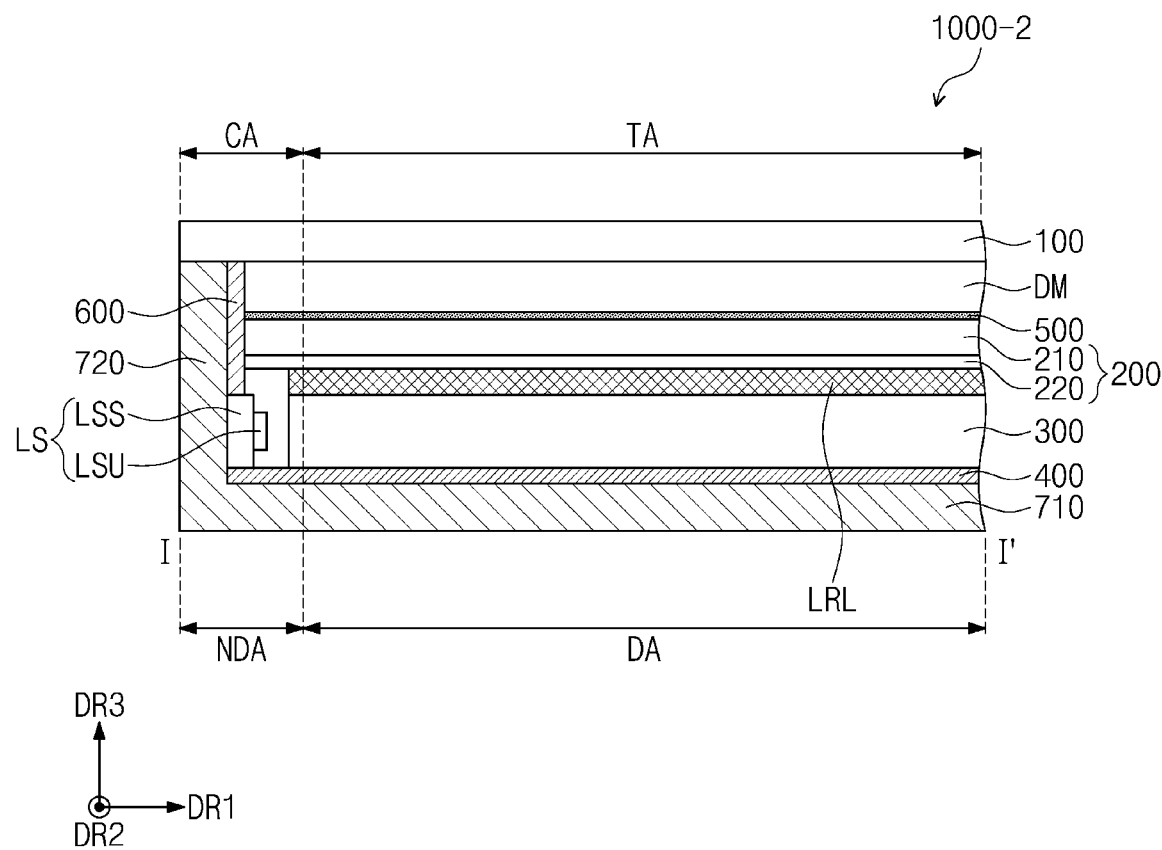
FIG. 4 is a cross-sectional view illustrating a display device according to an exemplary embodiment of the present inventive concept.

FIG. 3 is a cross-sectional view of a display device according to an exemplary embodiment of the present inventive concept. FIG. 4 is a cross-sectional view of a display device according to an exemplary embodiment of the present inventive concept. Hereinafter, a display device according to an exemplary embodiment of the present inventive concept will be described with reference to FIGS. 3 and 4. The same reference numeral may refer to corresponding components of FIG. 2, and it may be understood that details not provided may be the same as or similar to those of corresponding components that are described elsewhere in the specification.

Referring to FIG. 3, a display device 1000-1 according to an exemplary embodiment of the present inventive concept may include a spacing member SM disposed between the light conversion member 200 and the backlight unit BLU. The spacing member SM may include a spacer SP and a binder layer BD.

The spacer SP may be disposed between the light conversion member 200 and the backlight unit BLU. The spacer SP may be disposed between the transfer layer 220 provided in the light conversion member 200 and the light guide plate 300 provided in the backlight unit BLU. The spacer SP may be disposed between the transfer layer 220 and the light guide plate 300 to space the transfer layer 220 from the light guide plate 300 by a predetermined distance "d" (see FIG. 2). The spacer SP may come into contact with a bottom surface of the transfer layer 220 and a top surface of the light guide plate 300 to maintain a desired distance between the transfer layer 220 and the light guide plate 300 and thereby to provide an air-gap AG (see FIG. 2) between the transfer layer 220 and the light guide plate 300. Although the spacer SP is illustrated as having a bead shape (e.g. a globular shape) in FIG. 3, the present inventive concept is not limited thereto. For example, the spacer SP may have various shapes. For example, the spacer SP may have a pillar structure having a truncated cone shape.

The binder layer BD may be disposed above the light guide plate 300 provided in the backlight unit BLU to fix the spacer SP on the light guide plate 300. To provide an air-gap between the transfer layer 220 and the light guide plate 300, the binder layer BD may have a height less than the distance between the transfer layer 220 and the light guide plate 300.

Referring to FIG. 4, a display device 1000-2 according to an exemplary embodiment of the present inventive concept may further include a low reflective index layer LRL between the light conversion member 200 and the backlight unit BLU.

The low refractive index layer LRL may be disposed between the light conversion member 200 and the backlight unit BLU. The low refractive index layer LRL may be disposed between the transfer layer 220 provided in the light conversion member 200 and the light guide plate 300 provided in the backlight unit BLU. The low refractive index layer LRL may come into contact with a top surface of the light guide plate 300. The low refractive index layer LRL may be disposed between the transfer layer 220 and the light guide plate 300 to come into contact with a bottom surface of the transfer layer 220 and a top plate of the light guide plate 300. The low refractive index layer LRL may have a height that is substantially the same as a distance d (see FIG. 2) between the transfer layer 220 and the light guide plate 300.

The low refractive index layer LRL may include a material having a low refractive index. For example, the low refractive index layer may have a refractive index similar to that of an air layer, e.g., a refractive index of about 1.0 to about 1.2. The low refractive index layer LRL may include an organic material having a low refractive index. Alternatively, the low refractive index layer LRL may include a plurality of nano rods, and air may be filled between the nano rods.

When the low refractive index layer LRL coming into contact with the light guide plate 300 provided in the backlight unit BLU is provided, the same light guide efficiency may be achieved as when an air-gap is provided above the light guide plate 300. For example, since the low refractive index layer LRL having the refractive index similar to that of the air layer is disposed on the light guide plate 300, total reflection of light may be inducted within the light guide plate 300 to increase the light guide efficiency of the light guide plate 300.

Figure 5:
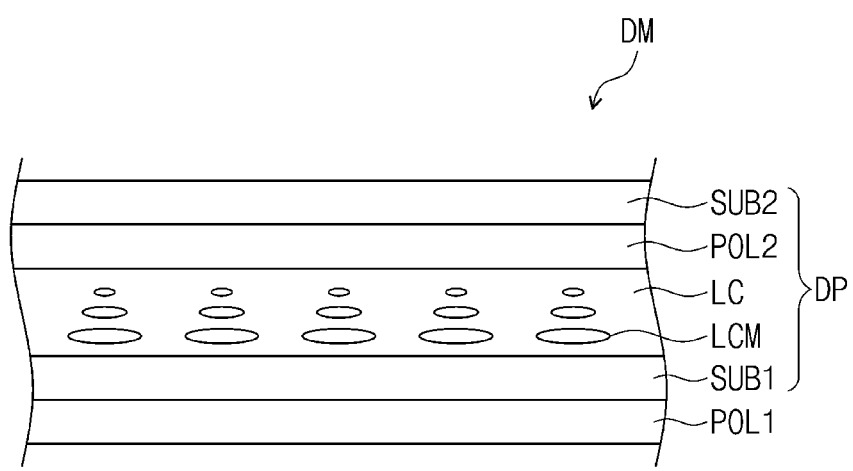
FIG. 5 is a cross-sectional view illustrating a portion of a display device according to an exemplary embodiment of the present inventive concept.

FIG. 5 is a cross-sectional view of a display module according to an exemplary embodiment of the present inventive concept. FIG. 5 is an enlarged view of the display module provided in the display device of FIG. 2. Hereinafter, a display module provided in the display device according to an exemplary embodiment of the present inventive concept will be described with reference to FIG. 5.

Referring to FIG. 5, a display module DM may include a first polarization layer POL1 and a display panel DP. The first polarization layer POL1 is disposed between the display panel DP and the backlight unit BLU to polarize components of light provided from the backlight unit BLU. The first polarization layer POL1 may have a transmission axis having a predetermined direction.

The display panel DP may be disposed on the first polarization layer POL1 to display an image through a display area DA. The display panel DP may be a light-receiving type display panel. For example, according to an exemplary embodiment of the present inventive concept, the display panel DP may be a liquid crystal display panel.

The display panel DP includes a first substrate SUB1, a second polarization layer POL2, a second substrate SUB2, and a liquid crystal layer LC.

The first substrate SUB1 is disposed on the first polarization layer POL1. The first substrate SUB1 may include a material having high light transmittance to transmit light provided from the backlight unit BLU. For example, the first substrate SUB1 may include a transparent glass substrate, a transparent plastic substrate, or a transparent film.

At least one pixel area and a non-pixel area adjacent to the pixel area may be defined on the first substrate SUB1 on the plane. Here, multiple pixel areas may be provided, and the non-pixel area may be defined between the pixel areas.

Pixels may be disposed on the pixel areas of the first substrate SUB1, respectively. Each of the pixels may include a plurality of pixel electrodes and a plurality of thin film transistors electrically connected in one-to-one correspondence to the pixel electrodes. The thin film transistors may be respectively connected to the pixel electrodes to switch a driving signal provided to each of the pixel electrodes.

The second substrate SUB2 is disposed above the first substrate SUB1 to face the first substrate SUB1. A liquid crystal layer LC may be disposed between the second substrate SUB2 and the first substrate SUB1. The liquid crystal layer LC includes a plurality of liquid crystal molecules CLM arranged in a predetermined direction.

The second substrate SUB2 may include a common electrode for generating electric fields, which control an arrangement of the liquid crystal molecules CLM together with the pixel electrodes. The display module DM drives the liquid crystal layer LC to display an image in an upward direction, e.g., in the third direction DR3.

A driving chip providing a driving signal to the display module DM, a tape carrier package on which the driving chip is mounted, and a printed circuit board electrically connected to the display panel DP through the tape carrier package may each be disposed on the display module DM.

The second polarization layer POL2 is disposed between the liquid crystal layer LC and the second substrate SUB2. However, the position of the second polarization layer POL2 is not limited to the arrangement shown in FIG. 3. For example, according to an exemplary embodiment of the present inventive concept, the second polarization layer POL2 may be disposed on the second substrate SUB2.

The second polarization layer POL2 may have an absorption axis having a predetermined direction. When a display mode of the display device 1000 is in a light state, the second polarization layer POL2 transmits light. When the display mode of the display device 1000 is in a dark state, the second polarization layer POL2 absorbs light.

An angle defined by the transmission axis of the first polarization layer POL1 and the absorption layer of the second polarization layer POL2 may be determined according to the arrangement mode of the liquid crystal molecules LCM. For example, the transmission axis of the first polarization layer POL1 may be perpendicular to the absorption axis of the second polarization layer POL2 on the plane.

Figure 6A:
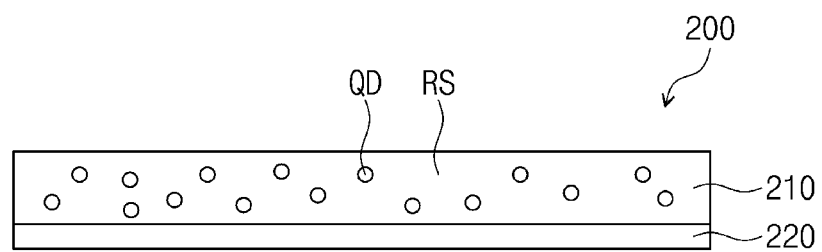
FIGS. 6A and 6B are cross-sectional views illustrating a portion of a display device according to an exemplary embodiment of the present inventive concept.
Figure 6B:
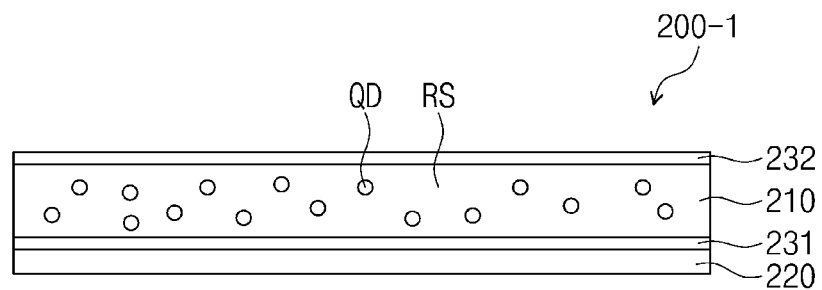

FIG. 6A is a cross-sectional view of the light conversion member according to an exemplary embodiment of the present inventive concept. FIG. 6B is a cross-sectional view of a light conversion member according to an exemplary embodiment of the present inventive concept. FIGS. 6A and 6B are enlarged views of the light conversion member provided in the display device of FIG. 2. Hereinafter, a light conversion member provided in the display device according to an exemplary embodiment of the present inventive concept will be described with reference to FIGS. 6A and 6B.

Referring to FIG. 6A, the light conversion member 200, according to an exemplary embodiment of the present inventive concept, includes the light conversion layer 210 and the transfer layer 220.

The transfer layer 2.20 may be disposed adjacent to the backlight unit BLU (see FIG. 2). The transfer layer 220 may include an acrylic-based polymer. The transfer layer 220 may include a polymer in which an acrylamide monomer is copolymerized. The transfer layer 220 may be formed by copolymerizing an acrylamide monomer. The transfer layer 220 may have a thickness of about 3 μm.

The light conversion layer 210 may include light conversion particles QD and a resin layer RS. The light conversion layer 210 may be formed by dispersing the light conversion particles QD into the resin layer RS.

The resin layer RS may have various structures in which the light conversion particles QD are capable of being dispersed into the resin layer RS. For example, the resin layer RS may include a urethane-based resin, an acrylic-based resin, or a silicon-based resin. The resin layer RS may have a thickness of about 5 μm.

The light conversion particles QD may be disposed in the resin layer RS. For example, the light conversion particles QD may be provided in plurality and uniformly dispersed in the resin layer RS. The light conversion particles QD may convert light provided from the backlight unit BLU into light having a different wavelength. The light conversion particles QD may be phosphors and/or quantum dots. In the light conversion member 200, according to an exemplary embodiment of the present inventive concept, the light conversion particles QD may be quantum dots.

Each of the quantum dots may include a material having a nano-sized crystal structure and may include several hundreds of atoms to several thousands of atoms. Each quantum dot may be sufficiently small to cause a quantum confinement effect. The quantum confinement effect may represent a phenomenon in which an object increases in band gap when the object has a size less than a nano size. Thus, when light having a wavelength with energy greater than that of a band gap is incident into the quantum dot, the quantum dot may absorb the light and thus be in an excited state to emit light having a specific wavelength, thereby returning to a ground state. The emitted light has a value corresponding to the band gap. When the quantum dot is adjusted in size and composition, light conversion characteristics due to the quantum confinement effect may be adjusted.

Although the quantum dot is not specifically limited in material as long as a general quantum dot is used, the quantum dot may be formed of, for example, at least one of Group-VI compounds, Group-V compounds, Group-VI compounds, Group-V compounds, Group-VI compounds, Group-III-compounds, Group-IV-compounds, and Group-IV-compounds.

The light conversion particles QD provided in the light conversion member 200 according to an exemplary embodiment of the present inventive concept include the quantum dots to receive light generated in the backlight unit BLU and convert the received light into light having a different wavelength, thereby providing the converted light to the display module that is disposed thereabove. For example, the light conversion particles QD may receive blue light from the backlight unit BLU and convert the blue light into white light to provide the white light to the display module. Although the quantum dot that is the light conversion particle QD has a single globular shape in FIGS. 6A and 6B, an exemplary embodiment of the present inventive concept is not limited thereto. For example, the light conversion particle QD may have a structure including a core and a shell overcoating the core. However, although the core is not limited to following materials, the core may include at least one of CdS, CdSe, CdTe, ZnS, ZnSe, ZnTe, GaN, GaP, GaAs, GaSb, AlN, AlP, AlAs, AlSb, InP, InAs, InSb, SiC, Ca, Se, In, P, Fe, Pt, Ni, Co, Al, Ag, Au, Cu, FePt, $Fe_2O_3$, $Fe_3O_4$, Si, and Ge. Also, although the shell is not limited to following materials, the shell may include at least one of ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TIN, TIP, TIAs, TISb, PbS, PbSe, and PbTe.

Referring to FIG. 6B, a light conversion member 200-1, according to an exemplary embodiment of the present inventive concept, may further include a first barrier layer 231 and a second barrier layer 232.

The first barrier layer 231 may be disposed between the transfer layer 220 and the light conversion layer 210. The second barrier layer 232 may be disposed on the light conversion layer 210. The second barrier layer 232 may be disposed between the light conversion layer 210 and the optical sheet 500 (see FIG. 2).

Figure 7A:
FIGS. 7A to 7C are cross-sectional views illustrating a portion of a display device according to an exemplary embodiment of the present inventive concept.
Figure 7B:
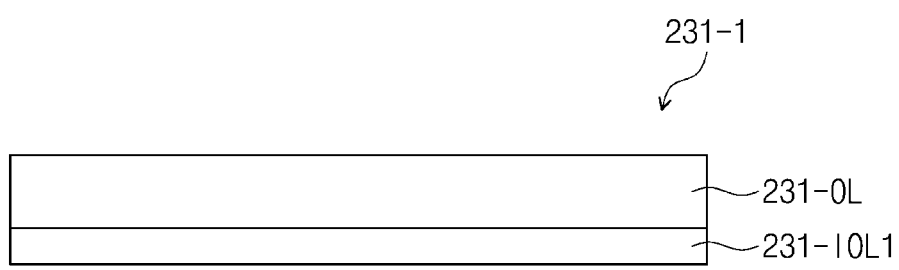
Figure 7C:
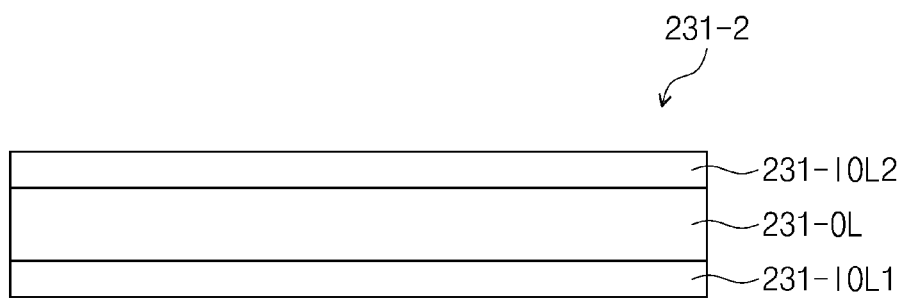

FIGS. 7A to 7C are cross-sectional views of the barrier layer according to an exemplary embodiment of the present inventive concept. FIGS. 7A to 7C are enlarged views of the first barrier layer of FIG. 6B. Hereinafter, the barrier layer provided in the display device according to an exemplary embodiment of the present inventive concept will be described with reference to FIGS. 7A to 7C. Although the first barrier layer is exemplarily illustrated in FIGS. 7A to 7C, the description with reference to FIGS. 7A to 7C may also be equally applied to the second barrier layer.

The first barrier layer 231 may include a first inorganic layer 231-IOL1. The first barrier layer 231 may have a single layer structure including the first inorganic layer 231-IOL1. Alternatively, the first barrier layer 231 may have a doublelayered structure in which the first inorganic layer 231-IOL1 and an organic layer 231-OL are laminated.

The first barrier layer 231 may have a structure in which the first inorganic layer 231-IOL1, the organic layer 231-OL, and a second inorganic layer 231-IOL2 are sequentially laminated. However, an exemplary embodiment of the present inventive concept is not limited to the above-described structure. For example, the first barrier layer 231 may have a multi-layered structure in which at least four layers of the inorganic layer and the organic layer are alternately laminated.

Each of the first inorganic layer 231-IOL1 and the second inorganic layer 231-IOL2 may include an inorganic material. Each of the first inorganic layer 2310-IOL1 and the second inorganic layer 231-IOL2 may include silicon oxide (SiOx), silicon nitride (SiNx), and/or silicon oxynitride (SiON). For example, each of the first inorganic layer 231-IOL1 and the second inorganic layer 231-IOL2 may include silicon nitride (SiNx). Each of the first inorganic layer 231-IOL1 and the second inorganic layer 231-IOL2 may be a thin film formed by depositing silicon nitride (SiNx).

Each of the first inorganic layer 231-IOL1 and the second inorganic layer 231-IOL2, which include the inorganic material such as silicon nitride (SiNx) may be a barrier layer that is capable of preventing moisture and oxygen from permeating into the light conversion layer 210. Each of the first inorganic layer 231-IOL1 and the second inorganic layer 231-IOL2 may be provided as a thin film through the deposition process of the inorganic material such as silicon nitride. Thus, the light conversion member 200-1 may be relatively thin, and the light conversion particles QD dispersed in the light conversion layer 210 may be prevented from being damaged by moisture and oxygen.

The organic layer 231-OL may have a predetermined thickness to polarize the first barrier layer 231. Also, the organic layer 2310-OL may prevent cracks from occurring due to damage of the first inorganic layer 2310-IOL1 and the second inorganic layer 231-IOL2.

The organic layer 231-OL may include an organic material. The organic layer 231-OL may include, for example, a siloxane-based organic compound. The organic layer 2310-OL may include olysilsesquioxane, polysilazane, and/or derivatives thereof.

According to the related art, where a light conversion member includes quantum dots as the light conversion particles, a relatively thin barrier film has to be disposed on both top and bottom surfaces of the light conversion layer to prevent the quantum dots from being damaged by moisture and oxygen.

In the light conversion member, according to an exemplary embodiment of the present inventive concept, the light conversion layer including the light conversion particles such as the quantum dots may be directly disposed on the transfer layer without having a separate barrier film. In the light conversion member, according to an exemplary embodiment of the present inventive concept, the light conversion layer including the quantum dots may be disposed on the transfer layer formed through a transfer process, and upper constituents such as the optical film and the display module may be attached to the light conversion member through a continuous process. Also, after the upper constituents such as the optical film and the display module are attached to the light conversion member, a sealing member covering side surfaces of the display module, the optical sheet, and the light conversion member may be provided. Thus, the light conversion member, according to an exemplary embodiment of the present inventive concept, may prevent the quantum dots provided in the light conversion member from being damaged by moisture and oxygen without having to use a relatively thick barrier film. Thus, although the light conversion member including the quantum dots is provided, the thin display device in which a thick barrier film is omitted may be realized.

Hereinafter, a method for fabricating the display device according to an exemplary embodiment of the present inventive concept will be described. The same reference numeral may be given to components that are at least similar to those of the display device according to the foregoing embodiment, and omitted details maybe substantially similar to those previously described.

FIG. 8 is a flowchart illustrating a method for fabricating the display device according to an exemplary embodiment of the present inventive concept. FIGS. 9A to 9F are cross-sectional views illustrating partial processes of the method for fabricating the display device according to an exemplary embodiment of the present inventive concept. FIGS. 10A to 10D are cross-sectional views illustrating the method for fabricating the display device according to an exemplary embodiment of the present inventive concept.

Referring to FIG. 8, a method for fabricating the display device, according to an exemplary embodiment of the present inventive concept, includes a process S100 of preparing a light conversion member 200, a process S200 of disposing an optical sheet 500 on the light conversion member 200, a process S300 of disposing a display module DM on the optical sheet 500 and a process S400 of disposing a backlight unit BLU under the light conversion member 200.

FIGS. 9A to 9F are cross-sectional views illustrating a process (S100) of preparing the light conversion member of the method for fabricating the display device according to an exemplary embodiment of the present inventive concept. Hereinafter, the process of preparing the light conversion member according to an exemplary embodiment of the present inventive concept will be described with reference to FIGS. 8 and 9A to 9F.

Figure 9A:
FIGS. 9A to 9F are cross-sectional views illustrating partial processes of a method for fabricating a display device according to an exemplary embodiment of the present inventive concept.
Figure 9B:
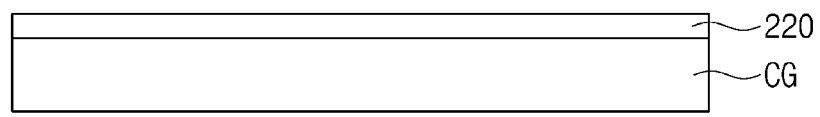

Referring to FIGS. 8 and 9A to 9B, the process (S100) of preparing the light conversion member according to an exemplary embodiment of the present inventive concept includes a process (S110) of forming a transfer layer 220 on a carrier substrate CG.

The carrier substrate CG may be a component that is removed after being used as a support substrate in the process of forming the light conversion member and includes a silicon wafer or a glass substrate. In the process (S110) of forming the transfer layer 220, a monomer MN may be applied to the carrier substrate CG to form the transfer layer 220. For example, the process (S110) of forming the transfer layer 220 may include a process of curing the monomer MN after the monomer MN is applied to the carrier substrate CG. The monomer MN may be applied to the carrier substrate CG through one process of screen printing, an inkjet process, and/or slit coating. The applied monomer MN may be cured under a condition of about 100° C./min on a hot plate to form the transfer layer 220.

The monomer MN may be an acrylic-based monomer. The monomer MN may include the acrylic-based monomer, and the transfer layer 220 may be an acrylic-based polymer that is formed by copolymerizing the acrylic-base monomer. The monomer MN may be an acrylamide monomer. The transfer layer 220 formed by using the acrylamide monomer may have a refractive index of about 1.430, a light transmittance of about 95.5%, and a glass transition temperature of about 180° C. to about 250° C. with respect to light having a wavelength of about 560 nm.

Referring to FIGS. 8 and 9A to 9C, the process (S100) of preparing the light conversion member according to an exemplary embodiment of the present inventive concept includes a process (S120) of forming a light conversion layer 210 on the transfer layer 220. The light conversion layer 210 includes light conversion particles QD and a resin layer RS.

The process (S120) of forming the light conversion layer 210 may include a process of applying a mixture including the light conversion particles QD and a resin material to the carrier substrate CG. The process of applying the mixture including the light conversion particles QD and the resin material may include a process of the mixture through screen printing, inkjet process, and/or slit coating.

The process (S120) of forming the light conversion layer 210 may further include a process of curing the mixture including the light conversion particles QD and the resin material through a curing device CM after applying the mixture. The light conversion particles QD provided in the light conversion layer 210 may be quantum dots. The process of curing the mixture applied to the carrier substrate CG may include a process of thermally processing the mixture under a condition of about 180° C. for about 30 minutes.

In the process of forming the light conversion layer 210 including the quantum dots as the light conversion particles, a curing temperature condition of about 180° C. is required. In the method for fabricating the light conversion member according to an exemplary embodiment of the present inventive concept, the transfer layer 220 formed under the light conversion layer 210 may include the acrylamide monomer having the glass transition temperature of about 180° C. to about 250° C. Thus, although the thermal processing is performed at a temperature of about 180° C. in the process of forming the light conversion layer including the quantum dots, the transfer layer may be prevented from being damaged by heat.

A process of forming a first barrier layer 231 (see FIG. 6B) on the transfer layer 220 may be further performed before the process of forming the light conversion layer 210. The process of forming the first barrier layer may include a process of depositing an inorganic material and/or an organic material. The inorganic material and the organic material may be applied to the transfer layer 220 through a process such as chemical vapor deposition (CVD) to form an inorganic layer and an organic layer, respectively.

The inorganic material may include silicon oxide (SiOx), silicon nitride (SiNx), and/or silicon oxynitride (SiON). The organic material may include a siloxane-based organic compound. The organic material may include olysilsesquioxane, polysilazane, and/or derivatives thereof.

A process of forming a second barrier layer 232 (see FIG. 6B) may be further performed after the process of forming the light conversion layer 210. The process of forming the second barrier layer may include a process of depositing an inorganic material and/or an organic material. The inorganic material and the organic material may be applied to the transfer layer 220 through a process such as chemical vapor deposition (CVD) to form an inorganic layer and an organic layer, respectively.

The inorganic material may include silicon oxide (SiOx), silicon nitride (SiNx), and/or silicon oxynitride (SiON). The organic material may include a siloxane-based organic compound. The organic material may include olysilsesquioxane, polysilazane, and/or derivatives thereof. The first barrier layer may be formed before the process of forming the light conversion layer 210, and the second barrier layer may be formed after the process of forming the light conversion layer 210. The light conversion layer 210 may be formed between the first barrier layer and the second barrier layer. The first barrier layer and the second barrier may protect the light conversion layer 210 disposed between the first and second barrier layers against an external impact and prevent moisture and oxygen from being permeated into the light conversion layer 210.

Figure 9C:
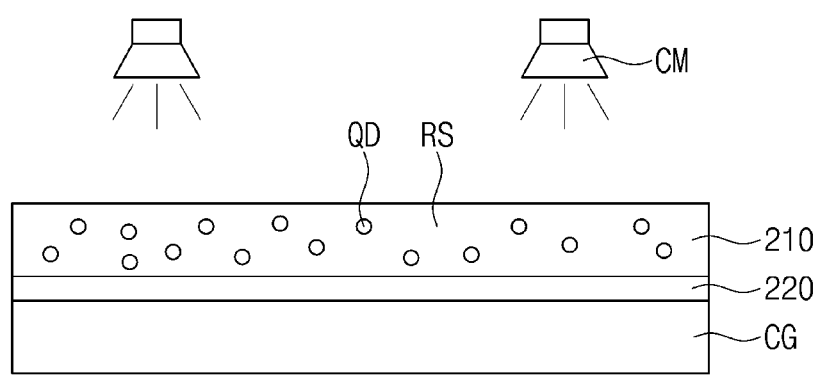
Figure 9D:
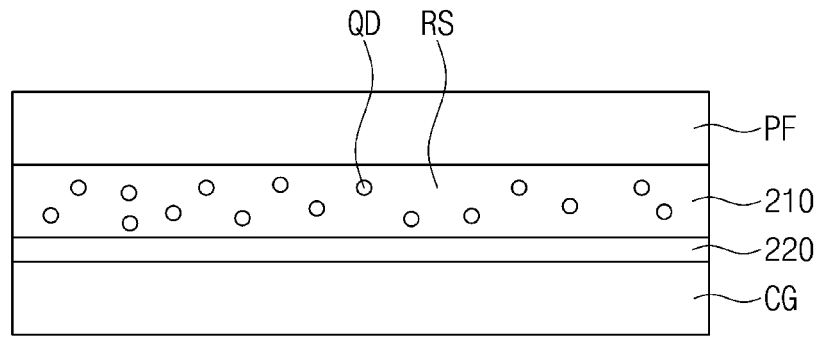

Referring to FIGS. 8, 9C and 9D, the process (S100) of preparing the light conversion member, according to an exemplary embodiment of the present inventive concept, includes a process (S130) of forming a protection film PF on the light conversion layer 210. The protection film PF may be attached to the light conversion layer 210 through a lamination process. The process of forming the protection film PF on the light conversion layer 210 may be continuously performed with a process of removing the carrier substrate CG that will be described later through a roll-to-roll process.

The protection film PF may have an adhesive force greater than that of the transfer layer 220. For example, the protection film PF may have an adhesion force of about 8 gf/inch, and the transfer layer 220 may have adhesion force of about 3 gf/inch.

Figure 9E:
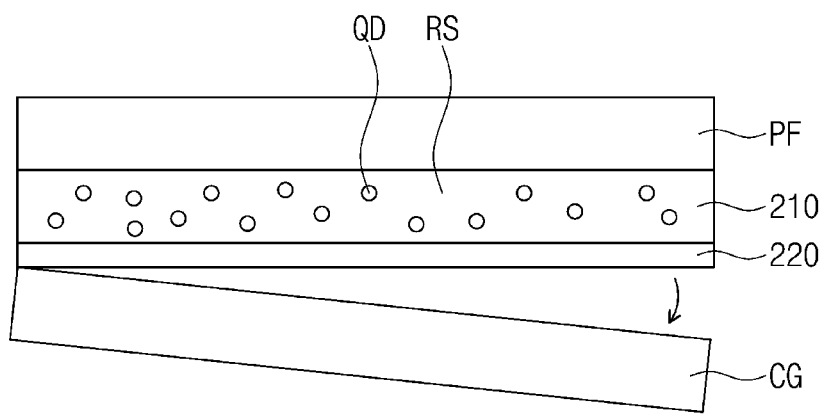

Referring to FIGS. 8, 9D and 9E, the process (S100) of preparing the light conversion member according to an exemplary embodiment of the present inventive concept includes a process (S140) of removing the carrier substrate CG after the protection film PF is attached.

The carrier substrate CG may be separated from the transfer layer 220 by a difference in adhesion force between the protection film PF and the transfer layer 220. For example, the process (S140) of removing the carrier substrate CG may be integrally performed with the process of attaching the protection film PF to the light conversion layer 210 through one roll-to-roll process. In the process of preparing the light conversion member, according to an exemplary embodiment of the present inventive concept, the transfer layer 220 has adhesion force of about 3 gf/inch, and the protection film PF has adhesion force of about 5 gf/inch. Thus, the transfer layer 220 may have adhesion force less than that of the protection film PF. Thus, while the protection film PF having the relatively high adhesion force is attached to the light conversion layer 210 in the roll-to-roll process, the carrier substrate CG coming into contact with the transfer layer 220 having the relatively low adhesion force may be removed by the difference in adhesion force.

In the process of preparing the light conversion member according to an exemplary embodiment of the present inventive concept, since the carrier substrate CG is removed by the difference in adhesion force without performing a separate cutting process, the fabricating process may be simplified, and fabricating costs may be reduced. Also, since a laser cutting process is not required, the light conversion particles such as the quantum dots provided in the light conversion layer may be prevented from being damaged by laser irradiation.

Figure 9F:
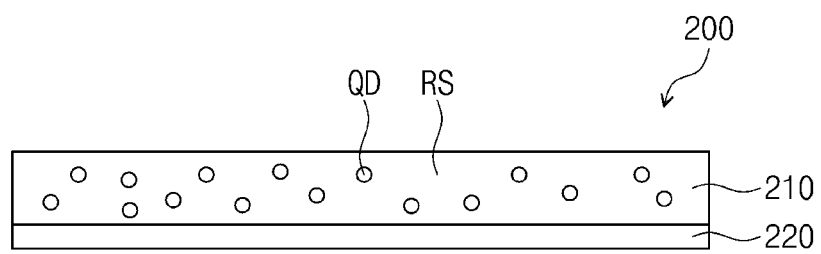

Referring to FIGS. 8 and 9E to 9F, the process (S100) of preparing the light conversion member, according to an exemplary embodiment of the present inventive concept, includes a process (S150) of removing the protection film PF.

The protection film PF may be removed from the light conversion member 200 after removing the carrier substrate CG. The protection film PF may be removed through a continuous process after the above-described roll-to-roil process.

FIGS. 10A to 10D are cross-sectional views illustrating processes performed after the process (S100) of preparing the light conversion member of the method for fabricating the display device according to an exemplary embodiment of the present inventive concept. Hereinafter, a method for fabricating the display device according to an exemplary embodiment of the present inventive concept will be described with reference to FIGS. 8 and 10A to 10D.

Figure 10A:
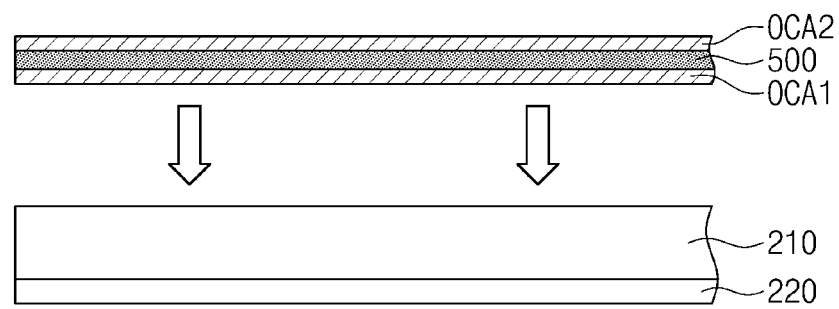
FIGS. 10A to 10D are cross-sectional views illustrating a method for fabricating a display device according to an exemplary embodiment of the present inventive concept.

Referring to FIGS. 8 and 10A, the method for fabricating the display device according to an exemplary embodiment of the present inventive concept includes a process (S200) of disposing an optical sheet on the light conversion member.

In the method for fabricating the display device according to an exemplary embodiment of the present inventive concept, an adhesion layer may be formed on both surfaces of the optical sheet 500. A first adhesion layer OCA1 may be formed under the optical sheet 500. A second adhesion layer OCA2 may be formed over the optical sheet 500. Each of the first adhesion layer OCA1 and the second adhesion layer OCA2 may include an optical clear adhesive (OCA).

In the process (S200) of disposing the optical sheet 500 on the light conversion member 200, the optical sheet 500 may be attached to the light conversion member 200 through the first adhesion layer OCA1. For example, the optical sheet 500 may be attached to the light conversion layer 210 through the first adhesion layer OCA1.

Figure 10B:
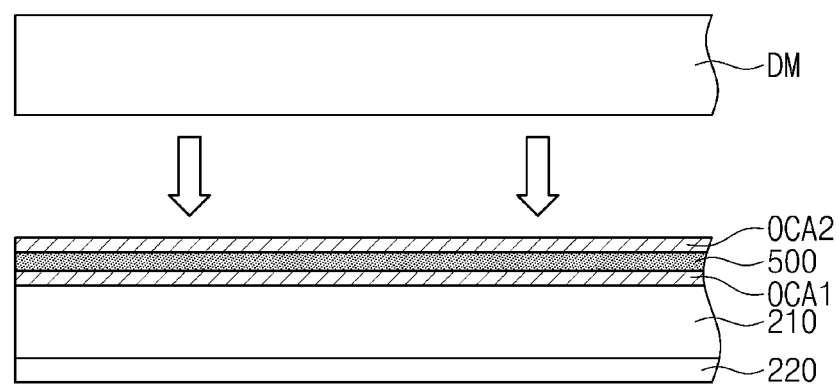

Referring to FIGS. 8 and 10B, the method for fabricating the display device according to an exemplary embodiment of the present inventive concept includes a process (S300) of disposing a display module on the optical sheet.

In the process (S300) of disposing the display module DM on the optical sheet 500, the display module DM may be attached to the optical sheet 500 through the second adhesion layer OCA2. In the method for fabricating the display device according to an exemplary embodiment of the present inventive concept, the optical sheet 500 and the display module DM may be continuously attached to the light conversion member 200 through the first and second adhesion layers OCA1 and OCA2, which are formed on top and bottom surfaces of the optical sheet 500. Thus, although a separate barrier film is not disposed on the light conversion member 200, the light conversion particles such as the quantum dot particles provided in the light conversion layer 210 of the light conversion member 200 may be prevented from being damaged by moisture and oxygen.

Figure 10C:
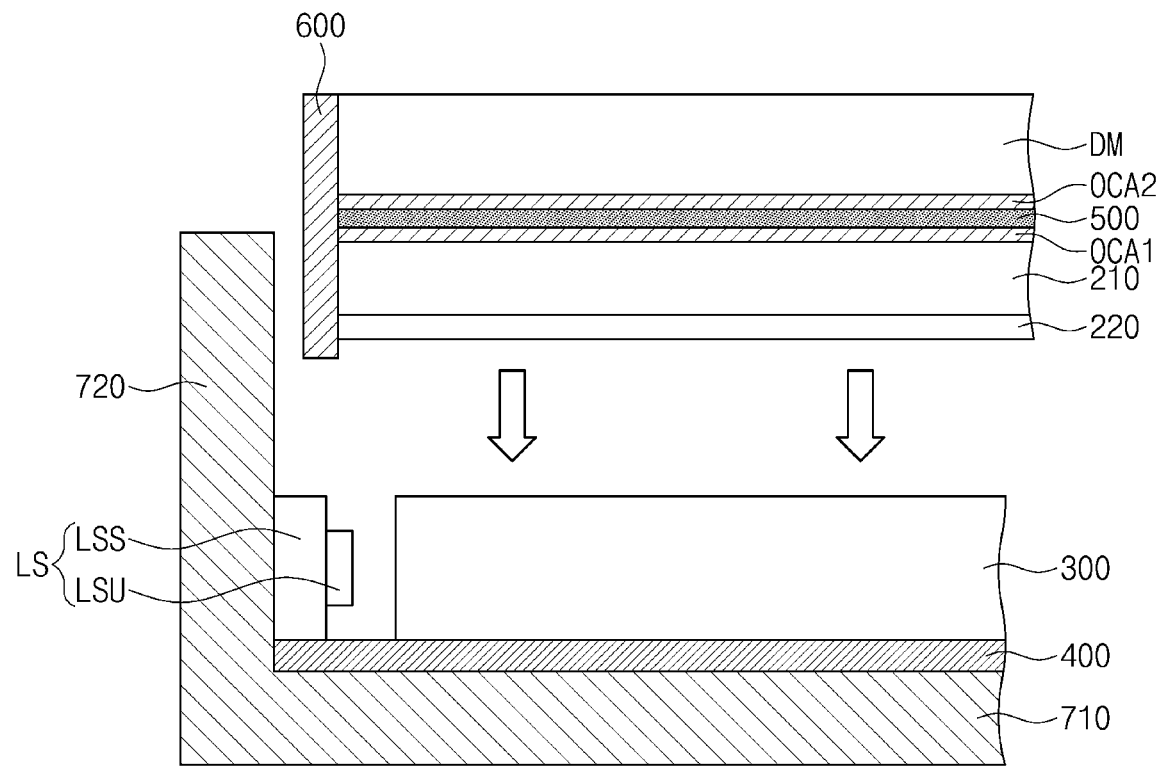
Figure 10D:
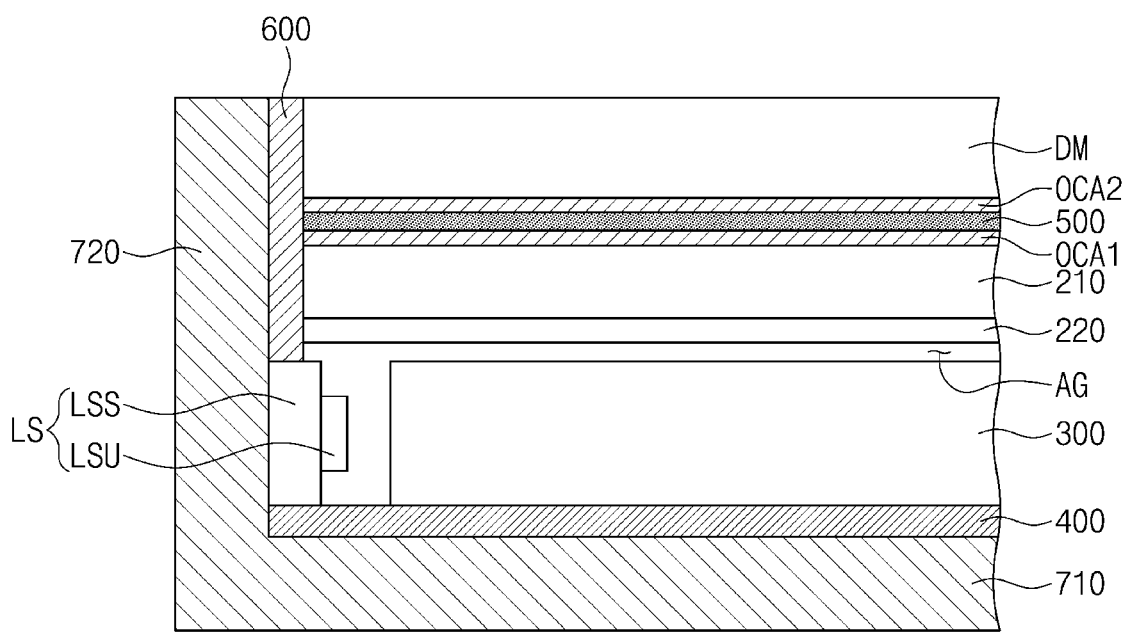

Referring to FIGS. 8, 10C, and 10D, the method for fabricating the display device according to an exemplary embodiment of the present inventive concept includes a process (S400) of disposing a backlight unit under the light conversion member.

The method for fabricating the display device according to an exemplary embodiment of the present inventive concept may include a process of forming a sealing member 600 that covers side surfaces of the display module DM, the optical sheet 500, and the light conversion member 200 before the process (S400) of disposing the backlight unit under the light conversion member. The sealing member 600 may surround edges of the side surfaces of the display module DM, the optical sheet 500, and the light conversion member 200. The sealing member 600 may cover the edges of the side surfaces of the display module DM, the optical sheet 500, and the light conversion member 200 to prevent foreign substances such as moisture and oxygen from being introduced into the display module DM, the optical sheet 500, and the light conversion member 200. Also, the sealing member 600 may fix the display module DM, the optical sheet 500, and the light conversion member 200 and allow the display module DM, the optical sheet 500, and the light conversion member 200 to be spaced a predetermined distance from the backlight unit in the process (S400) of disposing the backlight unit under the light conversion member 200. The sealing member 600 may adhere to a sidewall 720 of an accommodation member 700 on which the backlight unit is mounted.

Referring to FIG. 10D, in the process (S400) of disposing the backlight unit under the light conversion member in the method for fabricating the display device according to an exemplary embodiment of the present inventive concept, since the transfer layer 220 of the light conversion member and the light guide plate 300 of the backlight unit are spaced a predetermined distance from each other, an air-gap may be formed between the transfer layer 220 and the light guide plate 300. Since a separate adhesion layer is not formed between the transfer layer 220 and the light guide plate 300, the predetermined air-gap may be formed above the light guide plate 300. Since the predetermined air-gap is formed above the light guide plate 300, the light guide plate 300 in the display device according to an exemplary embodiment of the present inventive concept may increase the light guide efficiency.

In the method for fabricating the display device according to an exemplary embodiment of the present inventive concept, the light conversion layer including the light conversion particles such as the quantum dots may be formed on the transfer layer in the process of forming the light conversion member. The carrier substrate used as the support substrate when the light conversion member is formed may be removed by using the difference in adhesion force with the protection film without performing the separate laser cutting process. Thus, the fabricating process may be simplified, and the fabricating costs may be reduced. In addition, the quantum dot particles of the light conversion layer may be prevented from being damaged by the laser process.

Also, in the method for fabricating the display device according to an exemplary embodiment of the present inventive concept, the optical sheet and the display module may be disposed through the continuous process after the process of forming the light conversion member. Here, the optical sheet and the display module may be attached to the light conversion member through the adhesion layer. Thus, although the thick barrier sheet thickness is not formed on the top and bottom surfaces of the light conversion member, the light conversion particles such as the quantum dots provided in the light conversion layer of the light conversion member may be prevented from being damaged by moisture and oxygen, which are introduced from the outside.

The display device according to an exemplary embodiment of the present inventive concept may be the slim display device that is reduced in thickness while including the wavelength conversion member to increase the visibility and the color reproduction quality.

The method for fabricating the display device according to an exemplary embodiment of the present inventive concept may be simplified and fabricating costs may be reduced.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A display device comprising:
   a backlight unit;
   a display module configured to display an image, the display module being disposed on the backlight unit; and
   a light conversion member disposed between the display module and the backlight unit,
   wherein the backlight unit comprises:
   a light source unit configured to generate light; and
   a light guide plate configured to guide the light generated by the light source unit,
   wherein the light conversion member comprises:
   a transfer layer disposed adjacent to the backlight unit; and
   a light conversion layer disposed on the transfer layer,
   wherein the light conversion member is spaced apart from an upper surface the light guide plate by an air-gap of predetermined thickness.

2. The display device of claim 1, further comprising a spacing member disposed between the light conversion member and the light guide plate wherein the spacing member comprises:
   a spacer disposed between the light conversion member and the light guide plate to define the air-gap; and
   a binder layer disposed on the light guide plate, the binder layer fixing the spacer to the light guide plate.

3. The display device of claim 1, further comprising a low refractive index layer disposed between the light conversion member and the light guide plate, the low refractive index layer being in contact with the light guide plate.

4. The display device of claim 1, wherein the transfer layer comprises an acrylic-based polymer.

5. The display device of claim 4, Therein the transfer layer is made by copolymerizing an acrylamide monomer.

6. The display device of claim 1, wherein the light conversion layer comprises light conversion particles that convert the light, and wherein each of the light conversion particles comprises quantum dot particles.

7. The display device of claim 1, wherein the light conversion member further comprises:
   a first barrier layer disposed between the transfer layer and the light conversion layer; and
   a second barrier layer disposed on the light conversion layer.

8. The display device of claim 7, wherein each of the first and second barrier layers comprises an inorganic single layer, an inorganic-organic double layer, or a multi-layered structure in which an inorganic layer and an organic layer are alternately laminated.

9. The display device of claim 1, further comprising an optical sheet disposed between the light conversion member and the display module.

10. The display device of claim 9, further comprising a sealing member covering side surfaces of the display module, the optical sheet, and the light conversion member.

11. A method for fabricating a display device, the method comprising:
    preparing a light conversion member comprising a transfer layer and a light conversion layer disposed on the transfer layer;
    disposing an optical sheet on the light conversion member;
    disposing a display module on the optical sheet; and
    disposing a backlight unit under the light conversion member,
    wherein the preparing of the light conversion member comprises:
    applying a monomer to a carrier substrate to form the transfer layer;
    forming a resin layer and the light conversion layer comprising light conversion particles on the transfer layer;
    attaching a protection film on the light conversion layer;
    removing the carrier substrate from the transfer layer; and
    removing the protection film,
    wherein the protection film has an adhesion force greater than that of the transfer layer, and
    wherein the transfer layer is configured for separating the light conversion layer from the carrier substrate after the light conversion layer has been formed on the carrier substrate.

12. The method of claim 11, wherein the protection film has an adhesion force of 8 gf/inch, and wherein the transfer layer has adhesion force of 3 gf/inch.

13. The method of claim 11, wherein the forming of the transfer layer comprises curing the monomer after applying the monomer, and wherein the monomer comprises an acrylic-based monomer.

14. The method of claim 13, wherein the monomer comprises an acrylaminde monomer.

15. The method of claim 11, wherein, in the disposing of the backlight unit under the light conversion member, an air-gap is formed between the light conversion member and the backlight unit.

16. The method of claim 11, wherein the forming of the light conversion layer comprises:
    applying a mixture of a resin material and the light conversion particles to the transfer layer; and
    thermally curing the mixture.

17. The method of claim 16, herein the light conversion particles comprise quantum dots.

18. The method of claim 11, further comprising forming a sealing cover covering two opposite side surfaces of the display module, the optical sheet, and the light conversion member.

19. The method of claim 11, wherein the forming of the light conversion member further comprises:
    forming a first barrier layer on the transfer layer; and
    forming a second barrier layer on the light conversion layer,
    wherein the light conversion layer is formed between the first barrier layer and the second barrier layer.

20. The method of claim 19, wherein each of the forming of the first barrier layer and the forming of the second barrier layer comprises depositing an inorganic material and/or an organic material, and each of the first and second barrier layers comprises an inorganic single layer, an inorganic-organic double layer, or a multi-layered structure in which an inorganic layer and an organic layer are alternately laminated.

21. The method of claim 11, wherein the disposing of the optical sheet on the light conversion member comprises attaching the optical sheet on the light conversion member using a first adhesion layer formed on a lower portion of the optical sheet, and wherein the attaching of the display module on the optical sheet comprises attaching the display module on the optical sheet using a second adhesion layer formed on an upper portion of the optical sheet.

* * * * *